United States Patent
Koike et al.

(10) Patent No.: US 11,309,578 B2
(45) Date of Patent: Apr. 19, 2022

(54) POWER SUPPLY SYSTEM AND METHOD FOR CONTROLLING SAME

(71) Applicant: NISSAN MOTOR CO., LTD., Kanagawa (JP)

(72) Inventors: Tomoyuki Koike, Kanagawa (JP); Munemitsu Watanabe, Kanagawa (JP); Akifumi Koishi, Kanagawa (JP); Masahiko Tahara, Kanagawa (JP); Terumasa Tsuchiya, Kanagawa (JP); Atsushi Tezuka, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 769 days.

(21) Appl. No.: 16/087,503

(22) PCT Filed: Mar. 13, 2017

(86) PCT No.: PCT/JP2017/009890
§ 371 (c)(1),
(2) Date: Sep. 21, 2018

(87) PCT Pub. No.: WO2017/163959
PCT Pub. Date: Sep. 28, 2017

(65) Prior Publication Data
US 2019/0103629 A1    Apr. 4, 2019

(30) Foreign Application Priority Data
Mar. 22, 2016  (JP) .............................. JP2016-056445

(51) Int. Cl.
*H01M 10/0525*    (2010.01)
*H01M 10/44*    (2006.01)
(Continued)

(52) U.S. Cl.
CPC ....... *H01M 10/0525* (2013.01); *B60R 16/033* (2013.01); *G06F 1/263* (2013.01);
(Continued)

(58) Field of Classification Search
CPC ...................... H02J 7/14; H02J 7/1423; H02J 7/1438–1469; H02J 7/1492; H02J 7/0068; H02J 3/32; H02J 3/322; H02J 3/007
See application file for complete search history.

(56) References Cited

U.S. PATENT DOCUMENTS

2011/0260544 A1  10/2011  Imai et al.
2014/0091767 A1  4/2014  Tamura et al.

FOREIGN PATENT DOCUMENTS

JP    2006-141127 A    6/2006
JP    2011208599 A    10/2011
(Continued)

OTHER PUBLICATIONS

Machine translation of JP2015136263A. (Year: 2021).*

*Primary Examiner* — David V Henze-Gongola
(74) *Attorney, Agent, or Firm* — Osha Bergman Watanabe & Burton LLP

(57) ABSTRACT

A power supply system that is mountable on a vehicle includes a lithium-ion storage battery connected to an electrical load via two paths being a first path and a second path, a power generator capable of charging the lithium-ion storage battery, a first switch provided on the first path, an electrical resistance element provided on the second path, and a controller configured to control on/off of the power generator and perform on/off control of the first switch. According to a voltage increase request from the electrical load, the controller is configured to turn of the first switch such that a power supply to the lithium-ion storage battery through the first path from the power generator is cut.

8 Claims, 6 Drawing Sheets

(51) Int. Cl.
  *H02J 7/14*       (2006.01)
  *H02J 7/34*       (2006.01)
  *B60R 16/033*     (2006.01)
  *H02J 7/00*       (2006.01)
  *G06F 1/26*       (2006.01)
  *H01M 10/12*      (2006.01)
(52) U.S. Cl.
  CPC ........... *H01M 10/12* (2013.01); *H01M 10/44* (2013.01); *H02J 7/00043* (2020.01); *H02J 7/1423* (2013.01); *H02J 7/34* (2013.01); *H01M 2200/108* (2013.01); *H01M 2220/20* (2013.01)

(56) References Cited

FOREIGN PATENT DOCUMENTS

| | | | |
|---|---|---|---|
| JP | 2011-234479 A | | 11/2011 |
| JP | 2015-136263 A | | 7/2015 |
| JP | 2015136263 A | * | 7/2015 |

* cited by examiner ic circuit, the lithium-ion battery cannot be easily reconnected. If the lithium-ion battery is disconnected when the output from the lithium-ion battery is also required due to a request of the electrical load and so on, there is a possibility of degrading the durability of the lead-acid battery.

One or more embodiments of the present invention provides a power supply system, including a lead-acid storage battery and a lithium-ion storage battery, that can quickly increase the system voltage without disconnecting the lithium-ion storage battery when increasing the system voltage according to a request of an electrical load, and a method for controlling such a power supply system.

According to one or more embodiments of the present invention, a power supply system that includes two secondary batteries having different charge and discharge characteristics and is mountable on a vehicle, the power supply system having a lead-acid storage battery connected to an electrical load; a lithium-ion storage battery connected to the electrical load in parallel with the lead-acid storage battery via two paths being a first path and a second path; a power generator capable of charging the lead-acid storage battery and the lithium-ion storage battery; a first switch provided on the first path; a second switch provided on the second path; an electrical resistance element provided on the second path and having a resistance value greater than a harness resistance of the first path; and a control unit configured to control on/off of the power generator and perform on/off control of the first and second switches according to a voltage increase request from the electrical load.

According to one or more embodiments of the invention, since it is possible to produce a potential difference between the system voltage and the lithium-ion battery, when increasing the system voltage according to the request of the electrical load, it is possible to quickly increase the system voltage by switching the system without disconnecting the lithium-ion battery.

POWER SUPPLY SYSTEM AND METHOD FOR CONTROLLING SAME

CROSS-REFERENCE TO RELATED APPLICATIONS

The present application is a national stage application of PCT/JP2017/009890 and claims priority to Japanese Patent Application No. 2016-056445 filed on Mar. 22, 2016, the contents of which are hereby incorporated by reference in their entirety.

BACKGROUND

Technical Field

The present invention relates to a power supply system including two types of secondary batteries that differ in durability against repetition of charge and discharge, and to a method for controlling the same.

Related Art

JP 2011-234479A discloses an electrical circuit for a vehicle including a lead-acid storage battery (hereinafter also referred to as a "lead-acid battery") and a lithium-ion battery. This electrical circuit is configured such that when automatically restarting an engine from idling stop, the power supply voltage of the vehicle drops momentarily due to high current that flows through a starter motor, and therefore, in terms of protection of part of vehicle electrical equipment loads (electrical loads) provided on the lithium-ion battery side, energization to the starter motor from the lithium-ion battery is interrupted and electric power is supplied to the starter motor only from the lead-acid storage battery.

SUMMARY

In such an electrical circuit, since the lithium-ion storage battery with high power density or high energy density compared to that of the lead-acid storage battery is provided as a second storage battery, power generation by an alternator is not frequently repeated so that durability of the lead-acid storage battery can be improved.

In the meantime, in an electrical circuit including two different types of secondary batteries, i.e. a lead-acid battery and a lithium-ion battery, like the electrical circuit of JP 2011-234479A, there are cases where, by a request from an electrical load, control is performed to temporarily increase the input voltage of the electrical load (i.e. the output voltage of the electrical circuit, the system voltage).

When there is this voltage increase request (hereinafter also referred to as a "voltage up request"), an alternator being a power generator in the electrical circuit is driven to perform power generation. When starting the power generation by the alternator, the lithium-ion battery is connected to the electrical load, and when its remaining charge (SOC: State of Charge) is low, the lithium-ion battery is charged before increasing the input voltage of the electrical load.

Therefore, in the state where the lithium-ion battery is connected in the above-described electrical circuit, the input voltage of the electrical load cannot be quickly increased in response to the voltage up request from the electrical load.

On the other hand, in order to avoid such a situation, it may be suggested that, in the electrical circuit of JP 2011-234479A, the lithium-ion battery be cut off (disconnected) from the system of the electrical circuit at proper timing. However, if the lithium-ion battery is once disconnected during operation of the electrical circuit, the lithium-ion battery cannot be easily reconnected.

DETAILED DESCRIPTION

Hereinafter, embodiments of the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
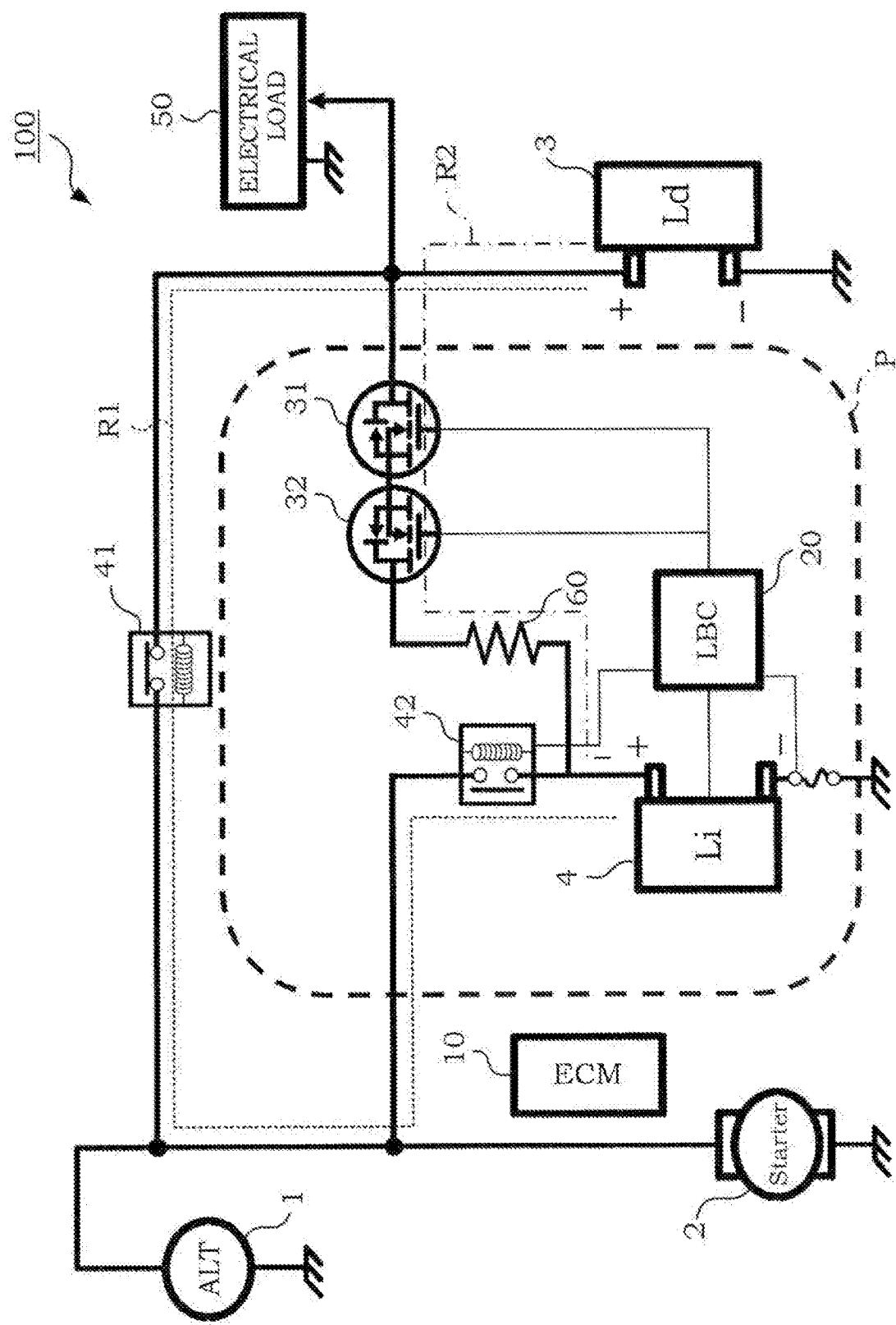
FIG. 1 is a block diagram showing the overall configuration of a power supply system in a first embodiment of the present invention.

FIG. 1 is a block diagram showing the overall configuration of a power supply system 100 in a first embodiment of the present invention. The power supply system 100 of the first embodiment is a power supply system that includes two secondary batteries having different charge and discharge characteristics and is mountable on a vehicle. The power supply system 100 is applied to, for example, a vehicle or the like that is equipped with an engine having a stop-start system.

As shown in FIG. 1, the power supply system 100 of the first embodiment includes a lead-acid battery (lead-acid storage battery) 3 and a lithium-ion battery (lithium-ion secondary battery) 4 that are connected in parallel with respect to an electrical load 50. Further, the power supply system 100 includes an alternator (power generator) 1, a starter 2, a lithium-ion battery controller (hereinafter referred to as an "LBC") 20 that controls the lithium-ion battery 4, and an engine control module (hereinafter referred to as an "ECM") 10 that controls the entire power supply system 100.

In the first embodiment, a portion surrounded by a dotted line is integrally formed as a lithium-ion battery pack P. The lithium-ion battery pack P includes the lithium-ion battery 4, a lithium-ion battery accessory relay 42, two MOSFETs 31, 32, and the LBC 20. Further, in the first embodiment, the lithium-ion battery pack P is provided with an electrical resistance element 60 between the lithium-ion battery 4 and the MOSFET 32.

The power supply system 100 includes a lead-acid battery path relay 41 for directly connecting the lead-acid battery 3 to the alternator 1 and the starter 2. As shown in FIG. 1, the lead-acid battery 3 is connected to the lithium-ion battery 4 by a first path R1 (indicated by a dotted line in FIG. 1) connected to the lithium-ion battery 4 via the lead-acid battery path relay 41 and the lithium-ion battery accessory relay 42, and by a second path R2 (indicated by a one-dot chain line in FIG. 1) connected to the lithium-ion battery 4 via the two MOSFETs 31, 32 and the electrical resistance element 60.

That is, the electrical resistance element 60 has one end connected to one end of the MOSFET 32 and the other end connected between the lithium-ion battery accessory relay 42 and the lithium-ion battery 4. In the power supply system 100 of the first embodiment, the electrical load 50 is connected to the lead-acid battery 3 side with respect to the lead-acid battery path relay 41. The alternator 1 and the starter 2 are connected to the lithium-ion battery 4 side with respect to the lead-acid battery path relay 41.

The lead-acid battery path relay 41 is formed by a so-called normally closed type relay that is in an on-state (conducting state) when a coil is not energized. The lithium-ion battery accessory relay 42 is formed by a so-called normally open type relay that is in an off-state (non-conducting state) when a coil is not energized.

In the first embodiment, a first switch may be, for example, the lithium-ion battery accessory relay 42. Using a time chart and a flowchart, a specific operation will be described later in detail.

The ECM 10 is formed by a microcomputer including a central processing unit (CPU), a read-only memory (ROM), a random access memory (RAM), and an input/output interface (I/O interface). The ECM 10 may alternatively be formed by a plurality of microcomputers. Although illustration is omitted, the ECM 10 functions as a determination means in the first embodiment.

The LBC 20 receives from the ECM 10 a signal indicative of a command for discharge to the starter 2 or the electrical load 50 or a charge command according to an operating condition of an engine not shown. Based on this signal, the LBC 20 performs on/off control of the lead-acid battery path relay 41, the lithium-ion battery accessory relay 42, and the MOSFETs 31, 32.

The alternator 1 is driven by driving force of the engine to generate electric power. In generating the electric power, the power generation voltage is variably controlled by LIN (Local Interconnect Network) communication or hardwiring. The alternator 1 can also regenerate kinetic energy of the vehicle as electric power during deceleration of the vehicle. Control of such power generation and regeneration is performed by the ECM 10.

The starter 2 is provided near the junction between the engine and an automatic transmission not shown. Like a general starting starter, the starter 2 includes a pinion gear that moves forward and backward. When the starter 2 is operated, the pinion gear engages with a gear provided on the outer periphery of a drive plate attached to a proximal end of a crankshaft, thereby performing cranking.

The MOSFET 31 is connected in such a way that the forward direction of its parasitic diode coincides with the direction from the lithium-ion battery 4 side toward the lead-acid battery 3 side. The MOSFET 32 is connected in such a way that the forward direction of its parasitic diode coincides with the direction from the lead-acid battery 3 side toward the lithium-ion battery 4 side. Consequently, when the MOSFETs 31, 32 are off, energization between the lead-acid battery 3 and the lithium-ion battery 4 in the second path R2 is prevented. In the first embodiment, a second switch may be, for example, the MOSFETs 31, 32.

When a predetermined condition is established, the LBC 20, based on a command from the ECM 10, turns on the MOSFETs 31, 32 to connect the lithium-ion battery 4 to the electrical load 50 and the lead-acid battery 3 (providing electrical conduction therebetween). The predetermined condition is, for example, a case where a request for increasing the system voltage is made from the electrical load 50. In order to increase the system voltage, it is suggested to drive the alternator 1 and set the system voltage based on the power generation voltage of the alternator 1.

Herein, when the lithium-ion battery accessory relay 42 is turned on so that the lithium-ion battery 4 and the alternator 1 are connected to each other, and when the remaining charge SOC of the lithium-ion battery 4 is low, the generated electric power of the alternator 1 is mainly used for charging the lithium-ion battery 4, and therefore, it is not possible to quickly increase the system voltage.

In the first embodiment, according to a voltage up request, the ECM 10 performs control to turn on the MOSFETs 31, 32 being the second switch to establish indirect electrical connection via the second path R2 including the electrical resistance element 60, and then turn off the lithium-ion battery accessory relay 42 being the first switch to interrupt the first path R1 being direct electrical connection between the alternator 1 and the lithium-ion battery 4. Consequently, even when the alternator 1 is being driven, since the charge current flows to the lithium-ion battery 4 through the electrical resistance element 60, it is possible to reduce the charging rate of the lithium-ion battery 4 and increase the system voltage to a value that is higher than the voltage of the lithium-ion battery 4 by a value corresponding to a voltage drop across the electrical resistance element 60.

In the power supply system 100 of the first embodiment, with the control performed by the ECM 10 in this way, it is possible to quickly increase the system voltage (i.e. the input voltage of the electrical load 50) in response to the voltage up request.

Since the electrical resistance element 60 is provided, the electrical resistance of the second path R2 is greater than that of the first path R1. Therefore, if the MOSFETs 31, 32 are turned on to make the second path R2 conductive in normal control, energy loss occurs through the electrical resistance element 60. Accordingly, the path may be quickly switched from the second path R2 to the first path R1 under a condition such that the voltage of the lithium-ion battery 4 becomes equal to or higher than a predetermined voltage or that the voltage up request has finished.

Likewise, the path may also be quickly switched from the second path R2 to the first path R1 when the SOC of the lithium-ion battery 4 becomes equal to or greater than a predetermined value or when the connection of the lithium-ion battery 4 via the first path R1 is allowed under another condition.

Figure 2:
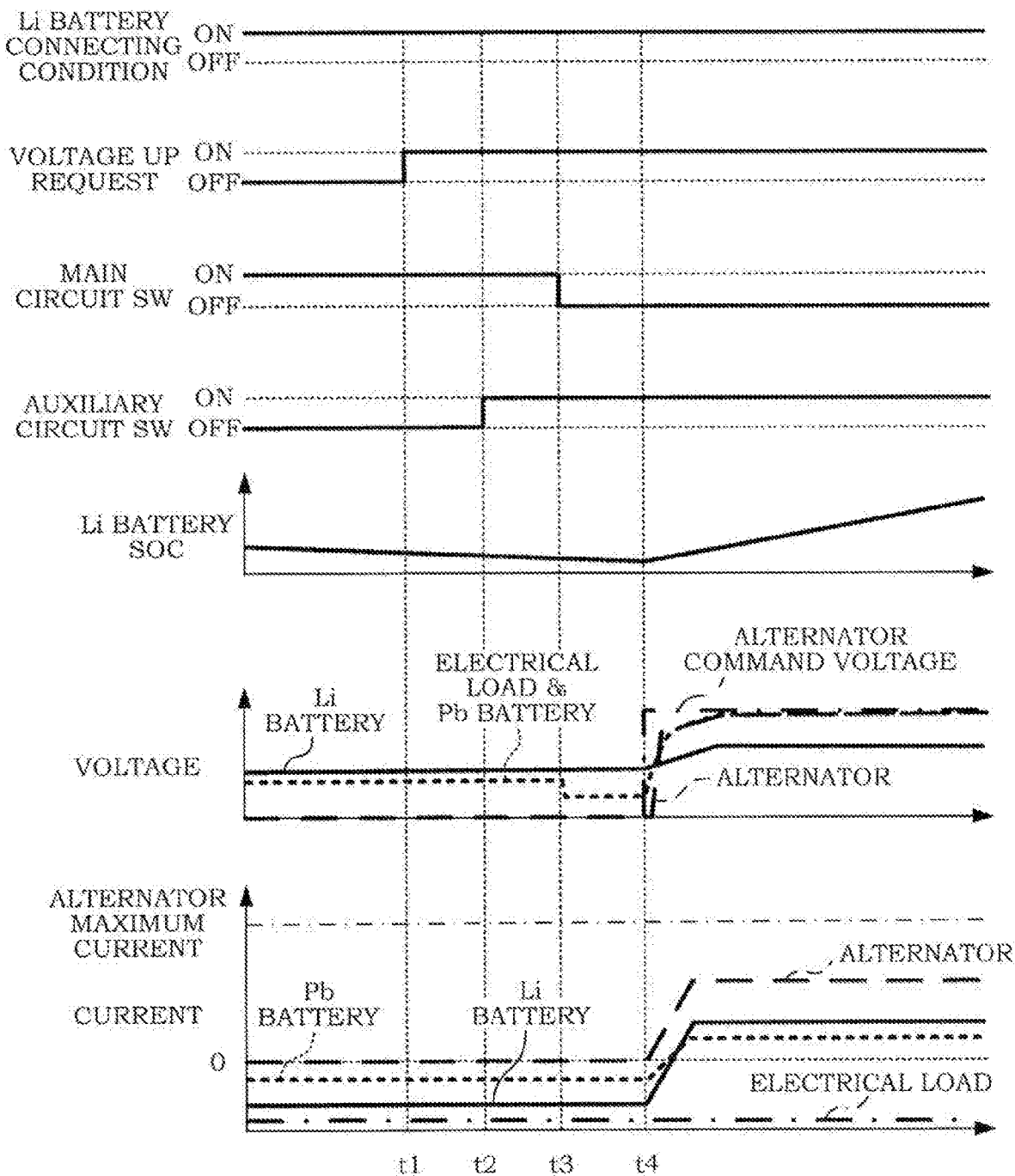
FIG. 2 is a time chart showing on/off control of a main circuit switch and an auxiliary circuit switch and the operation of an alternator during power generation in the power supply system of the first embodiment.

Next, using a time chart shown in FIG. 2, the operation of the power supply system 100 of the first embodiment will be described. In FIG. 2, the operation until driving the alternator 1, which is a feature of one or more embodiments of the present invention, is mainly shown, while illustration of switching from the second path R2 to the first path R1 and the operation until stopping the alternator 1 is omitted. Further, the interval between time t1 and time t4 is shown to be wider than actual. It is assumed that the condition for connection of the lithium-ion battery 4 via the second path R2 is always satisfied during the period shown in the time chart (see a graph of Li BATTERY CONNECTING CONDITION at the top in FIG. 2).

FIG. 2 is a time chart showing on/off control of a main circuit switch (first switch) and an auxiliary circuit switch (second switch) and the operation of the alternator 1 during power generation in the power supply system 100 of the first embodiment. In FIG. 2, the main circuit SW represents the lithium-ion battery accessory relay 42 being the first switch, and the auxiliary circuit SW represents the MOSFETs 31, 32 being the second switch.

When a voltage up request is output from the electrical load 50 to the ECM 10 at time t1, the ECM 10 first turns on the MOSFETs 31, 32 being the auxiliary circuit SW at time t2 so that the second path R2 conducts. Consequently, the first path R1 and the second path R2 are both connected to the electrical load 50 instantaneously. Since the electrical resistance element 60 is provided on the second path R2, the discharge current of the lithium-ion battery 4 is flowing to the electrical load 50 through the first path R1 in this state.

Then, at time t3, the ECM 10 turns off the lithium-ion battery accessory relay 42 being the main circuit SW so that conduction of the first path R1 is interrupted.

In this state, the discharge current of the lithium-ion battery 4 flows to the electrical load 50 through the second path R2, but the output voltage of the lead-acid battery 3 decreases by a value corresponding to a voltage drop across the electrical resistance element 60 (see a graph of VOLTAGE in FIG. 2). Accordingly, the input voltage of the electrical load 50 being the system voltage also decreases temporarily.

Then, after a predetermined time, at time t4, the ECM 10 drives the alternator 1 to switch the power supply system 100 from the charge mode (charge phase) to the power generation mode (power generation phase).

In this event, the ECM 10 outputs a voltage command value for the alternator 1, and the alternator 1 is driven and controlled so that the system voltage reaches the voltage command value. The actual output voltage of the alternator 1 rises later than the voltage command value, and following this, the system voltage, i.e. the input voltage of the electrical load 50, and the voltage across the terminals of the lead-acid battery 3 also increase. The voltage across the terminals of the lithium-ion battery 4 increases to a voltage value that is lower than the system voltage by a value corresponding to a voltage drop across the electrical resistance element 60.

The output current of the alternator 1 increases along with the increase in output voltage, but since the current that flows through the electrical load 50 is approximately constant, a portion of this output current becomes charge currents of the lead-acid battery 3 and the lithium-ion battery 4.

Although illustration is omitted, when the voltage across the terminals of the lithium-ion battery 4 becomes equal to or higher than a request voltage of the electrical load 50 or when the voltage up request from the electrical load 50 has finished, the ECM 10 turns on the lithium-ion battery accessory relay 42 and turns off the MOSFETs 31, 32, thereby performing control to switch from the second path R2 to the first path R1.

When the SOC of the lithium-ion battery 4 becomes equal to or greater than a predetermined value (herein, for example, a set upper limit value), the ECM 10 stops driving the alternator 1. In the first embodiment, also when the SOC of the lithium-ion battery 4 has reached the predetermined value, the ECM 10 may turn on the lithium-ion battery accessory relay 42 and turn off the MOSFETs 31, 32 to thereby switch from the second path R2 to the first path R1.

Figure 3:
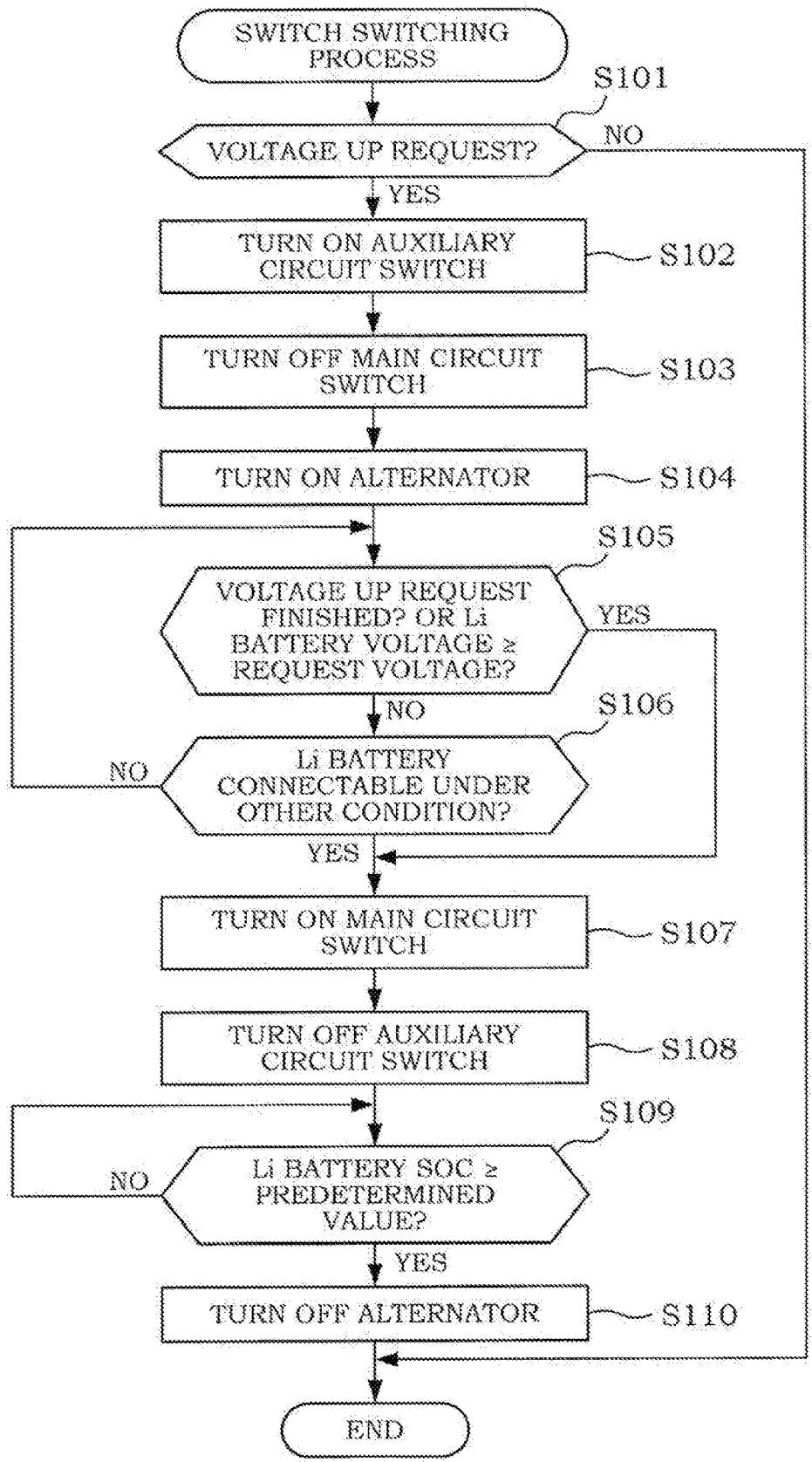
FIG. 3 is a flowchart showing a switch switching process that is executed by an ECM of the power supply system of the first embodiment.

Next, the operation of the power supply system 100 of the first embodiment will be described. FIG. 3 is a flowchart showing a switch switching process that is executed by the ECM 10 of the power supply system 100 of the first embodiment. The switch switching process is executed at a predetermined time interval (e.g. every 10 milliseconds) while the vehicle equipped with the power supply system 100 is operating.

In the switch switching process, the ECM 10 first determines whether or not there is a voltage up request from the electrical load 50 (step S101). When the ECM 10 has determined that there is no voltage up request, the ECM 10 ends the switch switching process as it is.

On the other hand, when the ECM 10 has determined that there is the voltage up request, the ECM 10 performs a process of switching from the main circuit to the auxiliary circuit. That is, the ECM 10 turns on the MOSFETs 31, 32 being the second switch (auxiliary circuit switch) (step S102) and turns off the lithium-ion battery accessory relay 42 being the first switch (main circuit switch) (step S103). Then, after a predetermined time when the voltage in the power supply system 100 is stabilized, the ECM 10 drives (turns on) the alternator 1 to switch the power supply system 100 from the discharge mode to the charge mode (step S104).

Then, the ECM 10 determines whether or not the voltage up request from the electrical load 50 has finished, and determines whether or not the voltage across the terminals of the lithium-ion battery 4 is equal to or higher than a request voltage of the electrical load 50 (step S105). When the ECM 10 has determined that the voltage up request has finished, or has determined that the voltage across the terminals of the lithium-ion battery 4 is equal to or higher than the request voltage, the ECM 10 advances the process flow to step S107 to perform a process of switching from the auxiliary circuit to the main circuit.

On the other hand, when the ECM 10 has determined that the voltage up request has not finished, and has determined that the voltage across the terminals of the lithium-ion battery 4 is not equal to or higher than the request voltage, the ECM 10 determines whether or not the lithium-ion battery 4 is connectable to the first path R1 on the main circuit side under another condition (step S106).

When the ECM 10 has determined at step S106 that the lithium-ion battery 4 is not connectable to the first path R1 on the main circuit side under the other condition, the ECM 10 repeats determination at steps S105 and S106 until any one of the conditions is established.

When the ECM 10 has determined at step S105 that the voltage up request has finished, has determined at step S105 that the voltage across the terminals of the lithium-ion battery 4 is equal to or higher than the request voltage, or has determined at step S106 that the lithium-ion battery 4 is connectable to the first path R1 on the main circuit side under the other condition, the ECM 10 turns on the lithium-ion battery accessory relay 42 being the first switch (main circuit switch) (step S107) and turns off the MOSFETs 31, 32 being the second switch (auxiliary circuit switch) (step S108). Consequently, the power supply system 100 is switched from the connection by the auxiliary circuit via the second path R2 to the connection by the main circuit via the first path R1.

Then, the ECM 10 determines whether or not the SOC of the lithium-ion battery 4 is equal to or greater than a predetermined value (step S109). As this predetermined value, for example, an SOC upper limit value during the operation of the lithium-ion battery 4 or the like is used.

When the ECM 10 has determined that the SOC of the lithium-ion battery 4 is less than the predetermined value, the ECM 10 repeats determination at step S109 until the SOC of the lithium-ion battery 4 becomes equal to or greater than the predetermined value.

On the other hand, when the ECM 10 has determined that the SOC of the lithium-ion battery 4 is equal to or greater than the predetermined value, the ECM 10 stops (turns off) driving the alternator 1 (step S110) and ends the switch switching process.

As described above, the power supply system 100 of the first embodiment is the power supply system 100 that includes the two secondary batteries having the different charge and discharge characteristics and is mountable on the vehicle, wherein the power supply system 100 is configured to include the lead-acid battery 3 (lead-acid storage battery) connected to the electrical load 50, the lithium-ion battery 4 (lithium-ion storage battery) connected to the electrical load 50 in parallel with the lead-acid battery 3 via the two paths being the first path R1 and the second path R2, the alternator 1 (power generator) capable of charging the lead-acid battery 3 and the lithium-ion battery 4, the lithium-ion battery accessory relay 42 (first switch) provided on the first path R1, the MOSFETs 31, 32 (second switch) provided on the second path R2, the electrical resistance element 60 provided on the second path R2 and having a resistance value greater than a harness resistance of the first path R1, and the ECM 10 (control means) that controls on/off of the alternator 1 and performs on/off control of the lithium-ion battery accessory relay 42 and the MOSFETs 31, 32 according to a voltage up request (voltage increase request) from the electrical load 50.

In the first embodiment, by configuring the power supply system 100 in this way, the ECM 10 turns on the MOSFETs 31, 32 being the second switch and turns off the lithium-ion battery accessory relay 42 being the first switch according to the voltage up request from the electrical load 50 to thereby switch the path from the first path R1 to the second path R2 and then drives the alternator 1. Consequently, the generated electric power of the alternator 1 is supplied to the electrical load 50 and is also used for charging the lithium-ion battery 4. In this case, since the electrical resistance element 60 is provided on the second path R2, while charging the lithium-ion battery 4, it is possible to quickly increase the system voltage (the input voltage of the electrical load 50) by a value corresponding to a voltage drop that is caused by the flow of the charge current.

In this way, according to the power supply system 100 of the first embodiment, since it is possible to produce a potential difference between the system voltage (the input voltage of the electrical load 50) and the lithium-ion battery 4 by the electrical resistance element 60 provided on the second path R2, when increasing the system voltage according to the request of the electrical load 50, it is possible to quickly increase the system voltage (the input voltage of the electrical load 50) by switching the system without disconnecting the lithium-ion battery 4.

In the power supply system 100 of the first embodiment, the ECM 10 (control unit) also functions as a determination unit that determines the presence or absence of a voltage up request (voltage increase request). When the voltage up request from the electrical load 50 is determined to be present, the ECM 10 is configured to turn on the MOSFETs 31, 32 (second switch) and turn off the lithium-ion battery accessory relay 42 (first switch), and then switch the alternator 1 (power generator) to the power generation mode. Consequently, according to the voltage up request, while charging the lithium-ion battery 4, it is possible to quickly increase the system voltage (the input voltage of the electrical load 50) by a value corresponding to a voltage drop that is caused by the flow of the charge current.

In the power supply system 100 of the first embodiment, the first switch may be formed by either of the two relays, i.e. the lead-acid battery path relay 41 and the lithium-ion battery accessory relay 42. In the first embodiment, the first switch is formed by the lithium-ion battery accessory relay 42. Consequently, the first path R1 on the main circuit side can be properly interrupted.

In the power supply system 100 of the first embodiment, one end of the MOSFETs 31, 32 being the second switch (one end of the MOSFET 32 in FIG. 1) is connected between the lithium-ion battery accessory relay 42 being one of the two relays that can form the first switch, and the lithium-ion battery 4 (lithium-ion storage battery). Consequently, the lithium-ion battery accessory relay 42 and the MOSFETs 31, 32 can respectively fulfill the functions of the first switch and the second switch.

In the power supply system 100 of the first embodiment, as an electrical resistance element that is provided on the second path R2, it may be the electrical resistance element 60 with a fixed resistance value or a harness resistance of the second path R2 itself. When the harness resistance of the second path R2 is used, this harness resistance may be set to, for example, about twice the harness resistance of the first path R1. Specifically, when the harness resistance of the first path R1 is about 3 to 5 mΩ, the harness resistance of the second path R2 may be set to about 5 to 10 mΩ. When the electrical resistance element 60 with the fixed resistance value is provided, this resistance value may be set to about 2 to 5 mΩ so that the resistance value of the second path R2 as a whole becomes about 5 to 10 mΩ described above. This is because if the electrical resistance element 60 with a resistance value that is too large is provided, energy loss due to copper loss becomes large.

A method for controlling the power supply system 100 of the first embodiment is such that, in the power supply system 100 including the lead-acid battery 3 (lead-acid storage battery) connected to the electrical load 50, the lithium-ion battery 4 (lithium-ion storage battery) connected to the electrical load 50 in parallel with the lead-acid battery 3 via the two paths being the first path R1 and the second path R2, the alternator 1 (power generator) capable of charging the lead-acid battery 3 and the lithium-ion battery 4, the lithium-ion battery accessory relay 42 (first switch) provided on the first path R1, the MOSFETs 31, 32 (second switch) provided on the second path R2, and the electrical resistance element 60 provided on the second path R2 and having a resistance value greater than a harness resistance of the first path R1, the method is configured to include a step of determining the presence or absence of a voltage up request (voltage increase request) from the electrical load 50, a step of turning on the MOSFETs 31, 32 being the second switch and turning off the lithium-ion battery accessory relay 42 being the first switch when having determined that the voltage up request is present, and a step of switching the alternator 1 to the power generation mode after the switch on/off step. By configuring the method for controlling the power supply system 100 in this way, the generated electric power of the alternator 1 is supplied to the electrical load 50 and is also used for charging the lithium-ion battery 4. In this case, since the electrical resistance element 60 is provided on the second path R2, while charging the lithium-ion battery 4, it is possible to quickly increase the system voltage (the input voltage of the electrical load 50) by a value corresponding to a voltage drop that is caused by the flow of the charge current.

Comparative Example

Figure 4:
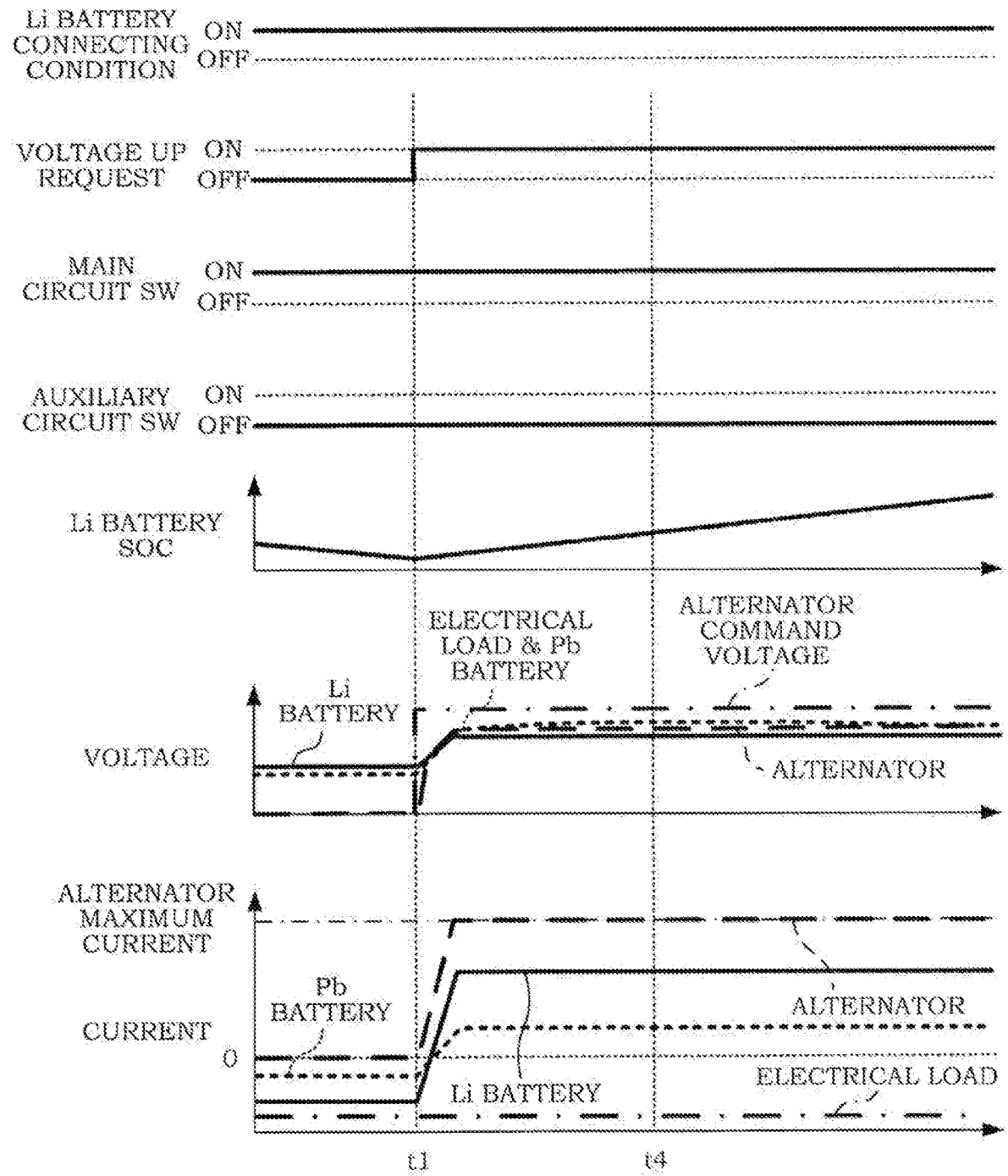
FIG. 4 is a time chart showing on/off control of a main circuit switch and an auxiliary circuit switch and the operation of an alternator during power generation in a power supply system of a comparative example.

Hereinafter, in order to clarify the operation of the power supply system 100 of the first embodiment, a comparative power supply system control will be described using a time chart of FIG. 4. FIG. 4 is a time chart showing on/off control of a main circuit switch and an auxiliary circuit switch and the operation of an alternator during power generation in a power supply system of a comparative example.

As shown in FIG. 4, in the power supply system of the comparative example, the main circuit switch is always on and the auxiliary circuit switch is always off. That is, the power supply system of the comparative example may have a hardware configuration equivalent to a hardware configuration in which the wiring including the MOSFETs 31, 32 and the electrical resistance element 60 on the second path R2 is removed in FIG. 1.

In this power supply system, according to a voltage up request from an electrical load, the alternator is driven to switch the power supply system from the discharge mode (discharge phase) to the power generation mode (power generation phase) without switching the path.

In this event, the alternator is driven and controlled so that the system voltage reaches a voltage command value. The actual output voltage of the alternator rises later than the voltage command value, and following this, the system voltage, i.e. the input voltage of the electrical load, the voltage across the terminals of a lithium-ion battery, and the voltage across the terminals of a lead-acid battery also increase.

In the power supply system of the comparative example, when the SOC of the lithium-ion battery is low, since the current that flows through the electrical load is approximately constant, a portion of the output current of the alternator becomes charge currents of the lead-acid battery 3 and the lithium-ion battery 4.

Since the power supply system of the comparative example does not include the electrical resistance element 60 of the power supply system 100 of the first embodiment, the system voltage does not increase until the lithium-ion battery is charged to a certain extent. Therefore, even when there is a voltage up request from the electrical load, it is not possible to quickly increase the system voltage.

Second Embodiment

Hereinafter, a second embodiment of the present invention will be described mainly with respect to points of difference from the first embodiment. In the second embodiment, the same symbols will be assigned to portions that perform the same functions as those of the first embodiment, thereby omitting a duplicate description as appropriate.

In the power supply system 100 of the first embodiment described above, the alternator 1 is connected to the lithium-ion battery 4 side with respect to the lead-acid battery path relay 41, and the electrical resistance element 60 is provided on the second path R2. The second embodiment differs from the first embodiment in that the alternator 1 is connected to the electrical load 50 side with respect to the lead-acid battery path relay 41, and that a current sensor 61 that functions as a shunt resistance is provided instead of the electrical resistance element 60.

Figure 5:
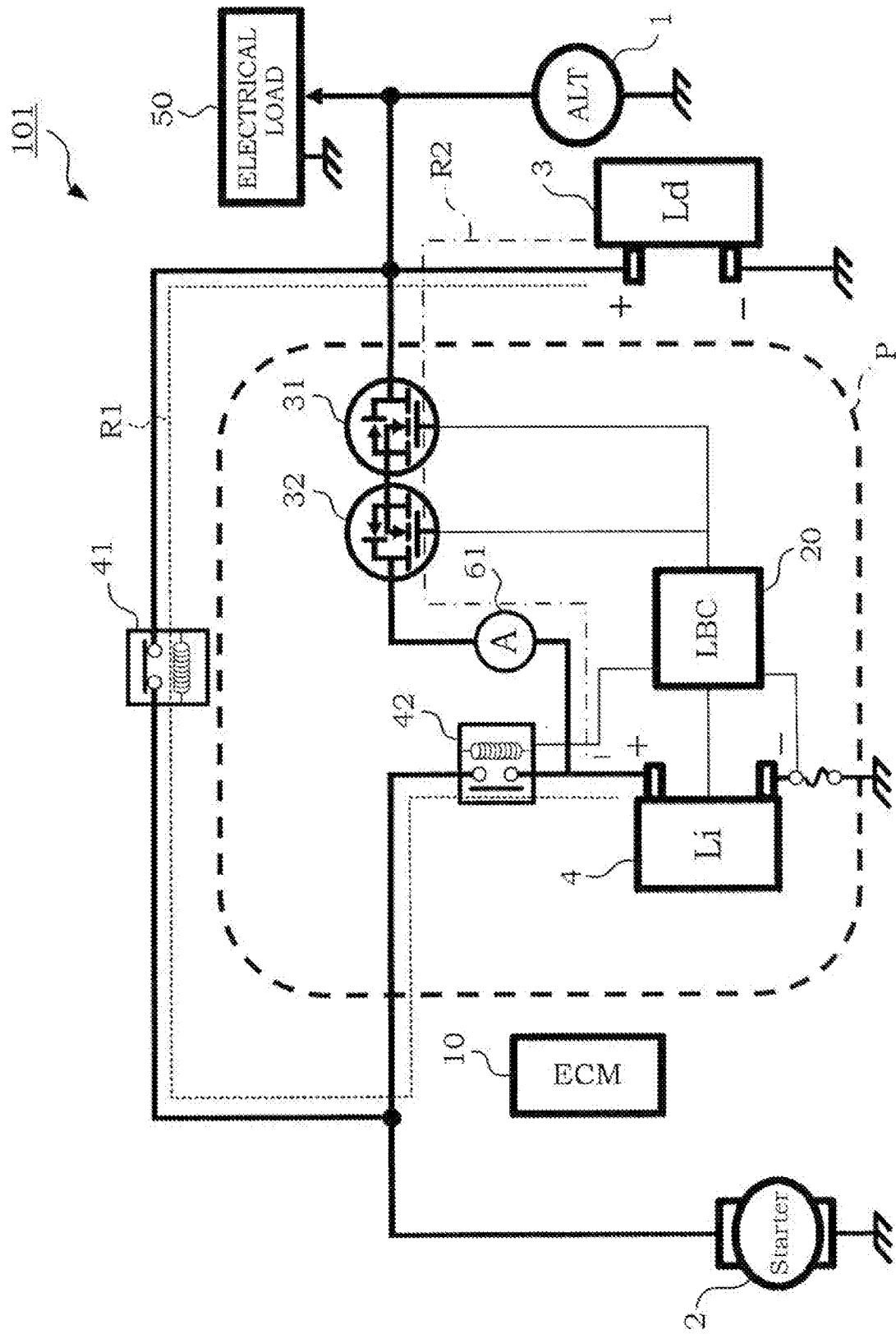
FIG. 5 is a block diagram showing the overall configuration of a power supply system in a second embodiment of the present invention.

FIG. 5 is a block diagram showing the overall configuration of a power supply system 101 in the second embodiment of the present invention. In the power supply system 101 of the second embodiment, the alternator 1 is connected to the electrical load 50 not via a relay or the like.

In the power supply system 101 of the second embodiment, like in the power supply system 100 of the first embodiment, when there is a voltage up request from the electrical load 50, the ECM 10 turns on the MOSFETs 31, 32 and then turns off the lithium-ion battery accessory relay 42. Consequently, in the power supply system 101, the connection between the lithium-ion battery 4 and the electrical load 50 is switched from the first path R1 to the second path R2.

Then, the ECM 10 drives the alternator 1. In the second embodiment, a portion of the output current of the alternator 1 is input into the lithium-ion battery 4 through the second path R2 provided with the current sensor 61 that also functions as the shunt resistance, thereby charging the lithium-ion battery 4.

In this event, the system voltage becomes higher than the lithium-ion battery 4 by a value corresponding to a voltage drop that is caused by the charge current flowing through the current sensor 61. Therefore, also in the second embodiment, like in the first embodiment, it is possible to quickly increase the system voltage in response to the voltage up request from the electrical load 50. In this way, according to the power supply system 101 of the second embodiment, it is possible to may operate similarly as the power supply system 100 of the first embodiment.

In the power supply system 101 of the second embodiment, the first switch may be formed by either of the two relays, i.e. the lead-acid battery path relay 41 and the lithium-ion battery accessory relay 42. In the second embodiment, like in the first embodiment, the first switch is formed by the lithium-ion battery accessory relay 42.

In the power supply system 101 of the second embodiment, the current sensor 61 that also functions as the shunt resistance is used instead of the electrical resistance element 60 of the first embodiment. Also in this case, it is possible to quickly increase the system voltage by a value corresponding to a voltage drop that is caused by the charge current flowing through the current sensor 61.

Third Embodiment

Hereinafter, a third embodiment of the present invention will be described mainly with respect to points of difference from the second embodiment. In the third embodiment, the same symbols will be assigned to portions that perform the same functions as those of the first embodiment, thereby omitting a duplicate description as appropriate.

In the power supply system 101 of the second embodiment described above, the current sensor 61 is provided on the second path R2, and one end of the MOSFET 32 is connected between the lithium-ion battery 4 and the lithium-ion battery accessory relay 42 via the current sensor 61. The third embodiment differs from the second embodiment in that the electrical resistance element 60 is provided like in the first embodiment instead of the current sensor 61 that functions as the shunt resistance, and that one end of the MOSFET 32 is connected between the lead-acid battery path relay 41 and the lithium-ion battery accessory relay 42 via the electrical resistance element 60.

Figure 6:
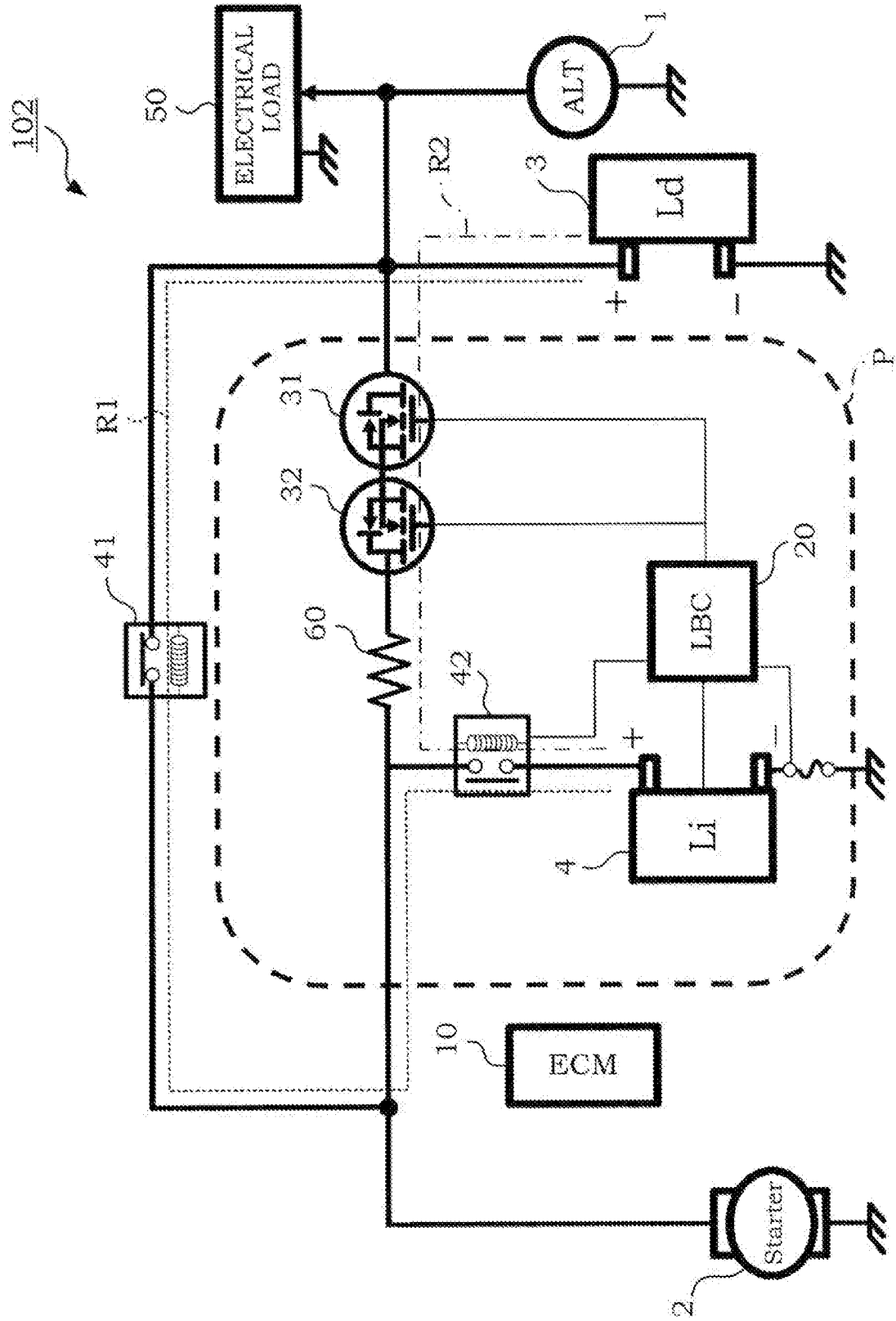
FIG. 6 is a block diagram showing the overall configuration of a power supply system in a third embodiment of the present invention.

FIG. 6 is a block diagram showing the overall configuration of a power supply system 102 in the third embodiment of the present invention. In the power supply system 102 of the third embodiment, one end of the MOSFET 32 is connected between the lead-acid battery path relay 41 and the lithium-ion battery accessory relay 42 via the electrical resistance element 60.

In the third embodiment, with such a difference in the hardware configuration, the first switch may be, for example, the lead-acid battery path relay 41. A specific operation will be described in detail while a time chart and a flowchart are omitted.

In the power supply system 102 of the third embodiment, when there is a voltage up request from the electrical load 50, the ECM 10 turns on the MOSFETs 31, 32 and then turns off the lead-acid battery path relay 41. Consequently, in the power supply system 102, the connection between the lithium-ion battery 4 and the electrical load 50 is switched from the first path R1 to the second path R2.

Then, the ECM 10 drives the alternator 1. In the third embodiment, a portion of the output current of the alternator 1 is input into the lithium-ion battery 4 through the second path R2 provided with the electrical resistance element 60 and through the lithium-ion battery accessory relay 42, thereby charging the lithium-ion battery 4.

In this event, the system voltage becomes higher than the lithium-ion battery 4 by a value corresponding to a voltage drop that is caused by the charge current flowing through the electrical resistance element 60. Therefore, also in the third embodiment, like in the first and second embodiments, it is possible to quickly increase the system voltage in response to the voltage up request from the electrical load 50. In this way, according to the power supply system 102 of the third embodiment, it is possible to operate similarly as the power supply system 100 of the first embodiment.

In the power supply system 102 of the third embodiment, the first switch may be formed by either of the two relays, i.e. the lead-acid battery path relay 41 and the lithium-ion battery accessory relay 42. In the third embodiment, differently from the first embodiment and the second embodiment, the first switch is formed by the lead-acid battery path relay 41.

In the power supply system 102 of the third embodiment, one end of the MOSFETs 31, 32 being the second switch (one end of the MOSFET 32 in FIG. 6) may be connected between the lead-acid battery path relay 41 and the lithium-ion battery accessory relay 42, being the two relays of the first switch, directly or indirectly via the electrical resistance element 60.

While embodiments of the present invention have been described above, the above-described embodiments only show part of application examples of the present invention and are not intended to limit the technical scope of the present invention to the specific configurations of the above-described embodiments.

In the first to third embodiments described above, the description has been given of the case where the power supply systems 100, 101, 102 each include the two MOSFETs 31, 32 as the second switch of the present invention. However, the present invention is not limited to such a hardware configuration. In the power supply system according to one or more embodiments of the present invention, for example, the second switch may be formed by the single MOSFET 31. Alternatively, instead of the MOSFETs 31, 32, the second switch may be realized by a mechanical or electrical switch having an on/off function, a program of the ECM 10, or the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A power supply system that is mountable on a vehicle, the power supply system comprising:
   a lithium-ion storage battery connected to an electrical load via a first path and a second path;
   a power generator capable of charging the lithium-ion storage battery;
   a first switch provided on the first path;
   an electrical resistance element provided on the second path; and
   a controller configured to control on/off of the power generator and perform on/off control of the first switch,
   wherein, according to a voltage increase request from the electrical load, the controller is configured to turn on the electrical resistance element such that the electrical load proceeds via the second path in addition to via the first path,
   wherein the controller is configured to turn off the first switch such that a power supply to the lithium-ion storage battery through the first path from the power generator is cut, and
   wherein, after the switching off and after a predetermined time, the controller is configured to switch the power generator to a power generation mode in which an input voltage of the electrical load increases such that a power generated by the power generator is supplied to the lithium-ion storage battery through the second path.

2. The power supply system according to claim 1, wherein the controller comprises a determination unit configured to determine presence or absence of the voltage increase request; and
wherein, when the determination unit has determined that the voltage increase request is present, the controller is configured to turn off the first switch, and then switch the power generator to the power generation mode.

3. The power supply system according to claim 1, wherein the first switch is formed by at least one of two relays.

4. The power supply system according to claim 3, wherein one end of the second switch is directly or indirectly connected between the two relays.

5. The power supply system according to claim 3, wherein one end of the second switch is connected between one of the two relays of the first switch and the lithium-ion storage battery.

6. The power supply system according to claim 1, wherein the electrical resistance element is formed by an electrical resistance element with a fixed resistance value, a harness resistance of the second path, or a current sensor.

7. A method for controlling a power supply system including:
a lithium-ion storage battery connected to an electrical load via a first path and a second path;
a power generator configured to charge the lead-acid storage battery and the lithium-ion storage battery;
a first switch provided on the first path; and
an electrical resistance provided on the second path,
the method comprising the steps of:
the voltage proceeding via the first path;
determining presence or absence of a voltage increase request from the electrical load;
turning on the electrical resistance element such that the electrical load proceeds via the first and the second paths;
turning off the first switch when having determined that the voltage increase request is present so that a power supply to the lithium-ion storage battery through the first path from the power generator is cut; and
switching, after the switching off and after a predetermined time, the power generator to a power generation mode in which an input voltage of the electrical load increases such that a power from the power generator to the lithium-ion storage battery through the second path.

8. The power supply system according to claim 1, further comprising:
a lead-acid storage battery which is connected to the electrical load, the lead-acid storage battery having different charge and discharge characteristics from the lithium-ion storage battery and the lead-acid storage battery connected to the electrical load in parallel with the lithium-ion storage battery,
wherein the second switch is provided on the second path and is configured to be controlled by the controller, and
wherein a resistance value of the electrical resistance element is greater than a harness resistance of the first path.

* * * * *